United States Patent
Song et al.

(10) Patent No.: US 11,091,568 B2
(45) Date of Patent: Aug. 17, 2021

(54) HYBRID SUPPORTED METALLOCENE CATALYST AND POLYOLEFIN PREPARATION METHOD USING SAME

(71) Applicant: LG CHEM, LTD., Seoul (KR)

(72) Inventors: Eun Kyoung Song, Daejeon (KR); Hyuck Ju Kwon, Daejeon (KR); Yi Young Choi, Daejeon (KR); Bog Ki Hong, Daejeon (KR); Kyung Jin Cho, Daejeon (KR); Joong Soo Kim, Daejeon (KR); Sun Mi Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/765,690

(22) PCT Filed: Jan. 12, 2017

(86) PCT No.: PCT/KR2017/000413
§ 371 (c)(1),
(2) Date: Apr. 3, 2018

(87) PCT Pub. No.: WO2017/146375
PCT Pub. Date: Aug. 31, 2017

(65) Prior Publication Data
US 2019/0085100 A1    Mar. 21, 2019

(30) Foreign Application Priority Data

Feb. 24, 2016 (KR) .................. 10-2016-0022079

(51) Int. Cl.
| | | |
|---|---|---|
| *C08F 4/653* | (2006.01) | |
| *C08F 4/6592* | (2006.01) | |
| *C08F 4/642* | (2006.01) | |
| *C08F 10/00* | (2006.01) | |
| *C08F 110/02* | (2006.01) | |
| *C08F 4/659* | (2006.01) | |
| *C08F 10/02* | (2006.01) | |
| *C08F 10/06* | (2006.01) | |
| *C08F 10/08* | (2006.01) | |
| *C08F 10/14* | (2006.01) | |
| *C08F 12/12* | (2006.01) | |
| *C08F 12/18* | (2006.01) | |

(52) U.S. Cl.
CPC .......... *C08F 4/65927* (2013.01); *C08F 4/642* (2013.01); *C08F 4/6592* (2013.01); *C08F 10/00* (2013.01); *C08F 110/02* (2013.01); *C08F 4/65912* (2013.01); *C08F 4/65916* (2013.01); *C08F 4/65925* (2013.01); *C08F 10/02* (2013.01); *C08F 10/06* (2013.01); *C08F 10/08* (2013.01); *C08F 10/14* (2013.01); *C08F 12/12* (2013.01); *C08F 12/18* (2013.01); *C08F 2420/06* (2013.01)

(58) Field of Classification Search
CPC .............. C08F 4/65905; C08F 4/65927; C08F 4/65825; C08F 4/65904; C08F 4/65925
See application file for complete search history.

(56) References Cited

U.S. PATENT DOCUMENTS

| | | |
|---|---|---|
| 6,759,361 B2 | 7/2004 | Lynch et al. |
| 8,980,781 B2 | 3/2015 | O'Hare et al. |
| 9,725,472 B2 | 8/2017 | Lee et al. |
| 9,725,533 B2 | 8/2017 | Lee et al. |
| 9,975,969 B2 * | 5/2018 | Cho ................. C08F 10/02 |
| 2016/0222139 A1 | 8/2016 | Cho et al. |
| 2016/0237187 A1 | 8/2016 | Hong et al. |
| 2016/0237188 A1 | 8/2016 | Hong et al. |
| 2017/0029538 A1 * | 2/2017 | Song ................. C08F 4/64 |

FOREIGN PATENT DOCUMENTS

| | | |
|---|---|---|
| JP | 4017202 B2 | 12/2007 |
| JP | 2016-536379 A | 11/2016 |
| JP | 2016-537444 A | 12/2016 |
| JP | 2017-516880 A | 6/2017 |
| KR | 10-0295941 B1 | 5/2001 |
| KR | 10-2011-0035968 A | 4/2011 |
| KR | 10-1049261 B1 | 7/2011 |
| KR | 10-2012-0076156 A | 7/2012 |
| KR | 10-1401851 B1 | 5/2014 |
| KR | 10-2015-0015789 A | 2/2015 |
| KR | 10-2015-0045369 A | 4/2015 |
| KR | 10-2015-0058054 A | 5/2015 |
| KR | 10-2015-0066484 A | 6/2015 |
| KR | 10-2015-0139462 A | 12/2015 |
| KR | 10-2015-0144281 A | 12/2015 |
| KR | 10-2016-0029718 A | 3/2016 |
| KR | 10-1618460 B1 | 5/2016 |
| KR | 10-1670468 B1 | 10/2016 |
| WO | 2015/016422 A1 | 2/2015 |
| WO | 2015/056974 A1 | 4/2015 |
| WO | 2015/056975 A1 | 4/2015 |
| WO | 2015/076618 A1 | 5/2015 |
| WO | 2015/186970 A1 | 12/2015 |
| WO | 2015/194813 A1 | 12/2015 |

OTHER PUBLICATIONS

Alexakis et al., "Mild Protection and Deprotection of Alcohols As Ter-Butyl Ethers in the Field of Pheromone Synthesis", Tetrahedron Letters, vol. 29, No. 24, pp. 2951-2954, 1988.

* cited by examiner

*Primary Examiner* — Caixia Lu
(74) *Attorney, Agent, or Firm* — Dentons US LLP

(57) ABSTRACT

The present invention relates to a hybrid supported metallocene catalyst and a polyolefin preparation method using the same. Using the hybrid supported metallocene catalyst can not only significantly reduce the amount of wax produced when polymerizing olefin monomers, but can also enhance the stress cracking resistance of the polyolefin that is prepared.

4 Claims, 1 Drawing Sheet

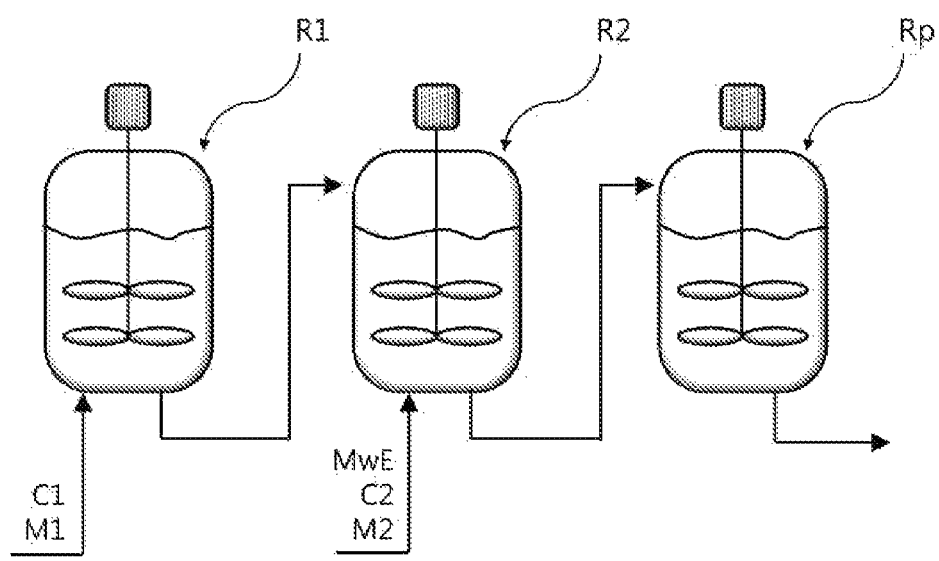

HYBRID SUPPORTED METALLOCENE CATALYST AND POLYOLEFIN PREPARATION METHOD USING SAME

CROSS-REFERENCE TO RELATED APPLICATION(S)

This application is a National Stage Application of International Application No. PCT/KR2017/000413 filed Jan. 12, 2017, and claims the benefit of Korean Patent Application No. 10-2016-0022079 filed Feb. 24, 2016, all of which are hereby incorporated by reference in their entirety for all purposes as if fully set forth herein.

BACKGROUND OF THE INVENTION

(a) Field of the Invention

The present invention relates to a hybrid supported metallocene catalyst and a polyolefin preparation method using same.

(b) Description of the Related Art

As a method for industrially preparing polyolefin from olefin, a solution polymerization process, a slurry polymerization process, a gas-phase polymerization process and the like are known. Among the, the solution polymerization process is a process in which a polymer is dissolved in a liquid phase, the slurry polymerization process is a process in which a polymer produced in a liquid phase polymerization medium is dispersed in a solid state, and the gas phase polymerization process is a process in which polymers produced in a gaseous polymerization medium are dispersed in a fluidized state.

Among them, the greatest problem occurring in the process of slurry polymerization using a heterogeneous catalyst is the mass production of wax, which not only contributes to the instability of the process occurring in the process, but also adversely affects the characteristics of the product. Particularly, there may be exemplified the deterioration of the pressure resistance characteristics of pipes requiring long-term physical properties, the TVOC problem of food containers and packaging materials, and the like.

Therefore, there is a continuing demand for a method for producing a metallocene catalyst capable of not only reducing the amount of wax produced during the production of polyolefin through slurry polymerization, but also improving the stress cracking resistance (Full Notch Creep Test, FNCT) of the produced polyolefin, and a method for producing polyolefins having desired physical properties using the above metallocene catalyst.

SUMMARY OF THE INVENTION

In order to solve the above problems of the prior arts, the present invention provides a hybrid supported metallocene catalyst capable of not only reducing the amount of wax produced during slurry polymerization but also improving stress cracking resistance of the produced polyolefin The present invention provides a hybrid supported metallocene catalyst comprising: one or more of a first metallocene compound represented by Chemical Formula 1; one or more of a second metallocene compound represented by Chemical Formula 3; one or more of a third metallocene compound represented by Chemical Formula 4; a cocatalyst compound; and a support.

In addition, the present invention provides a method for producing a polyolefin comprising a step of polymerizing an olefin monomer in the presence of the above-mentioned hybrid supported metallocene catalyst.

Hereinafter, a hybrid supported metallocene catalyst according to a specific embodiment of the present invention and a method for producing a polyolefin using the same will be described in more detail.

According to one embodiment of the present invention, there may be provided a hybrid supported metallocene catalyst comprising: one or more of a first metallocene compound represented by the following Chemical Formula 1; one or more of a second metallocene compound represented by the following Chemical Formula 3; one or more of a third metallocene compound represented by the following Chemical Formula 4; a cocatalyst compound; and a support:

[Chemical Formula 1]

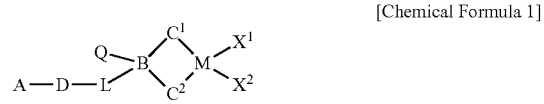

in Chemical Formula 1,

A is hydrogen, a halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C3 to C20 heterocycloalkyl group, or a C5 to C20 heteroaryl group;

D is —O—, —S—, —N(R)— or —Si(R)(R')—, wherein R and R' are the same as or different from each other and are each independently hydrogen, a halogen, a C1 to C20 alkyl group, a C2 to C20 alkenyl group, or a C6 to C20 aryl group;

L is a C1 to C10 linear or branched alkyl group;

B is carbon, silicon or germanium;

Q is hydrogen, a halogen, a C1 to C20 alkyl group, a C2 to C20 alkenyl group, a C6 to C20 aryl group, a C7 to C20 alkylaryl group, or a C7 to C20 arylalkyl group;

M is a Group 4 transition metal;

$X^1$ and $X^2$ are the same as or different from each other and are each independently a halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate acid group;

$C^1$ and $C^2$ are the same as or different from each other and are each independently one of the following Chemical Formulas 2a, 2b or 2c, provided that the case where both $C^1$ and $C^2$ are Chemical Formula 2c is excluded;

[Chemical Formula 2a]

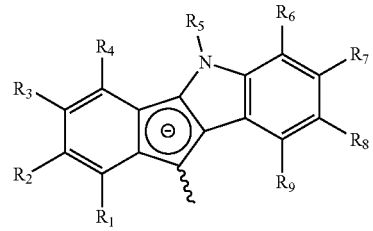

-continued

[Chemical Formula 2b]

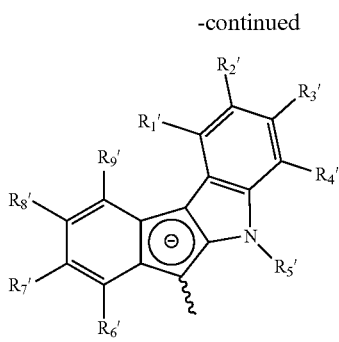

[Chemical Formula 2c]

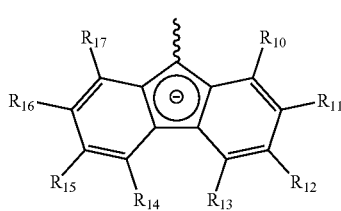

in Chemical Formulas 2a, 2b and 2c, $R_1$ to $R_{17}$ and $R_1'$ to $R_9'$ are the same as or different from each other and are each independently hydrogen, a halogen, a C1 to C20 alkyl group, a C2 to C20 alkenyl group, a C1 to C20 alkylsilyl group, a C1 to C20 silylalkyl group, a C1 to C20 alkoxysily group, a C1 to C20 alkoxy group, a C6 to C20 aryl group, a C7 to C20 alkylaryl group or a C7 to C20 arylalkyl group, and adjacent two or more substituents of $R_{10}$ to $R_{17}$ may be connected to each other to form a substituted or unsubstituted aliphatic or aromatic ring;

$$(Cp^1R^a)_n(Cp^2R^b)M^1Z^1_{3-n}$$ [Chemical Formula 3]

in Chemical Formula 3, $M^1$ is a Group 4 transition metal;

$Cp^1$ and $Cp^2$ are the same as or different from each other and are each independently any one selected from the group consisting of cyclopentadienyl, indenyl, 4,5,6,7-tetrahydro-1-indenyl, and fluorenyl radical, which may be substituted with hydrocarbons having 1 to 20 carbon atoms;

$R^a$ and $R^b$ are the same as or different from each other and are each independently hydrogen, a C1 to C20 alkyl, a C1 to C10 alkoxy, a C2 to C20 alkoxyalkyl, a C6 to C20 aryl, a C6 to C10 aryloxy, a C2 to C20 alkenyl, a C7 to C40 alkylaryl, a C7 to C40 arylalkyl, a C8 to C40 arylalkenyl, or a C2 to C10 alkynyl;

$Z^1$ is a halogen atom, a C1 to C20 alkyl, a C2 to C10 alkenyl, a C7 to C40 alkylaryl, a C7 to C40 arylalkyl, a C6 to C20 aryl, a substituted or unsubstituted C1 to C20 alkylidene, a substituted or unsubstituted amino group, a C2 to C20 alkylalkoxy, or a C7 to C40 arylalkoxy;

n is 1 or 0;

[Chemical Formula 4]

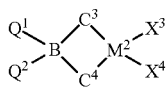

In Chemical Formula 4, $M^2$ is a Group 4 transition metal;

B is carbon, silicon or germanium;

$Q^1$ and $Q^2$ are the same as or different from each other and are each independently hydrogen, a C1 to C20 alkyl, or an alkyl group having 1 to 20 carbon atoms substituted with an alkoxy group having 1 to 20 carbon atoms;

$X^3$ and $X^4$ are the same as or different from each other and are each independently a halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

$C^3$ and $C^4$ are the same or different and each independently represents one of the following Chemical Formula 4a or 4b.

[Chemical Formula 4a]

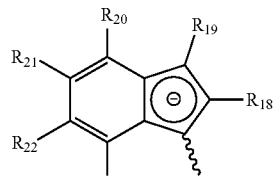

[Chemical Formula 4b]

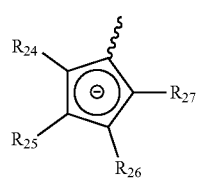

in Chemical Formulas 4a and 4b, $R_{18}$ to $R_{27}$ are the same as or different from each other and are each independently hydrogen, a C1 to C20 alkyl group, a C3 to C20 cycloalkyl group containing a hetero atom of N or O, a C6 to C20 aryl group, or an alkyl group having 1 to 20 carbon atoms substituted with an alkoxy group having 1 to 20 carbon atoms, and at least one of $Q^1$, $Q^2$, and $R_{18}$ to $R_{27}$ is an alkyl group having 1 to 20 carbon atoms substituted with an alkoxy group having 1 to carbon atoms.

In the hybrid supported metallocene catalyst according to the present invention, the substituents of Chemical Formulas 1, 3 and 4 will be described in more detail below.

The C1 to C20 alkyl group include a linear or branched alkyl group, and specifically include a methyl group, an ethyl group, a propyl group, an isopropyl group, an n-butyl group, a tert-butyl group, a pentyl group, a hexyl group, a heptyl group, an octyl group, and the like, but is not limited thereto.

The C2 to C20 alkenyl group includes a linear or branched alkenyl group, and specifically includes an allyl group, an ethenyl group, a propenyl group, a butenyl group, a pentenyl group, and the like, but are not limited thereto.

The C6 to C20 aryl group includes a monocyclic or fuse cyclic aryl group, and specifically includes a phenyl group, a biphenyl group, a naphthyl group, a phenanthrenyl group, a fluorenyl group, and the like, but is not limited thereto.

The C5 to C20 heteroaryl group includes a monocyclic or fused cyclic heteroaryl group, and specifically includes a carbazolyl group, a pyridyl group, a quinolinyl group, an isoquinoline group, a thiophenyl group, a furanyl group, an imidazole group, an oxazolyl group, a thiazolyl group, a triazine group, a tetrahydropyranyl group, a tetrahydrofuranyl group, and the like, but is not limited thereto.

The C1 to C20 alkoxy groups include a methoxy group, an ethoxy group, a phenyloxy group, and a cyclohexyloxy group, the like, but is not limited thereto.

The Group 4 transition metal include titanium, zirconium, hafnium, the like, but is not limited thereto.

In the hybrid supported metallocene catalyst according to the present invention, more preferably, $R_1$ to $R_{17}$ and $R_1'$ to $R_9'$ in Chemical Formulas 2a, 2b and 2c are each independently hydrogen, a methyl group, an ethyl group, a propyl group, an isopropyl group, an n-butyl group, a tert-butyl group, a pentyl group, a hexyl group, a heptyl group, an octyl group, a phenyl group, a halogen group, a trimethylsilyl group, a triethylsilyl group, a tripropylsilyl group, a tributylsilyl group, a triisopropylsilyl group, a trimethylsilyl group, a methoxyl group, or an ethoxy group, but are not limited thereto.

In Chemical Formula 1, L is more preferably a C4 to C8 linear or branched alkylene group, but is not limited thereto. Further, the alkylene group may be substituted or unsubstituted with a C1 to C20 alkyl group, a C2 to C20 alkenyl group, or a C6 to C20 aryl group.

Further, in Chemical Formula 1, A is preferably hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tetrahydropyranyl group, or a tetrahydrofuranyl group, but is not limited thereto.

In addition, in Chemical Formula 1, B is preferably silicon, but is not limited thereto.

The metallocene compound of Chemical Formula 1 forms a structure in which an indenoindole derivative and/or a fluorene derivative are crosslinked by a bridge and has an unshared electron pair capable of acting as a Lewis base in the structure of the ligand, thereby exhibiting high polymerization activity even when supported on a surface having a Lewis acid property of a support. In addition, the activity is high by including electron-rich indenoindole derivative and/or a fluorene group, and due to appropriate steric hindrance and the electronic effect of the ligand, the hydrogen reactivity is low and also the high activity is maintained even in the presence of hydrogen. Moreover, beta-hydrogen of the polymer chain in which the nitrogen atom of the indenoindole derivative grows can be stabilized by hydrogen bonding to suppress beta-hydrogen elimination and polymerize ultra-high molecular weight polyolefinic polymer.

According to one embodiment of the present invention, a specific example of the compound represented by Chemical Formula 2a may include a compound represented by one of the following structural formulas, but the present invention is limited thereto.

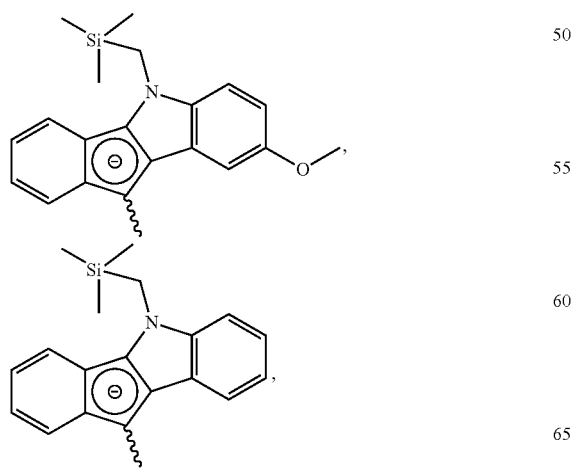

-continued

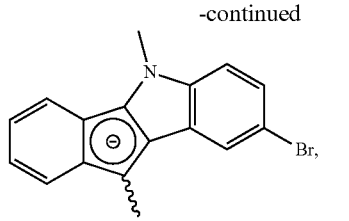

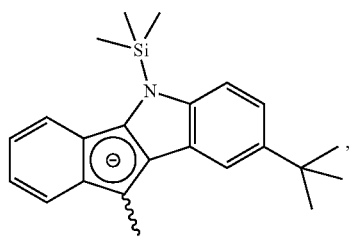

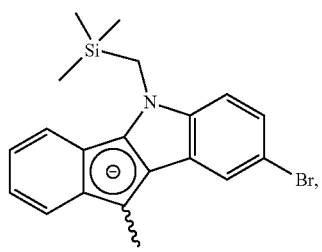

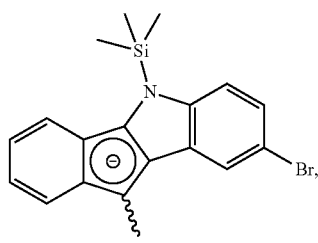

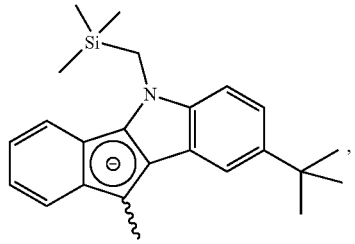

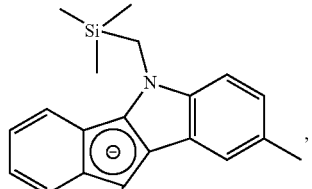

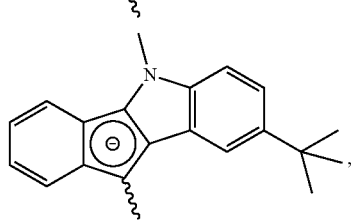

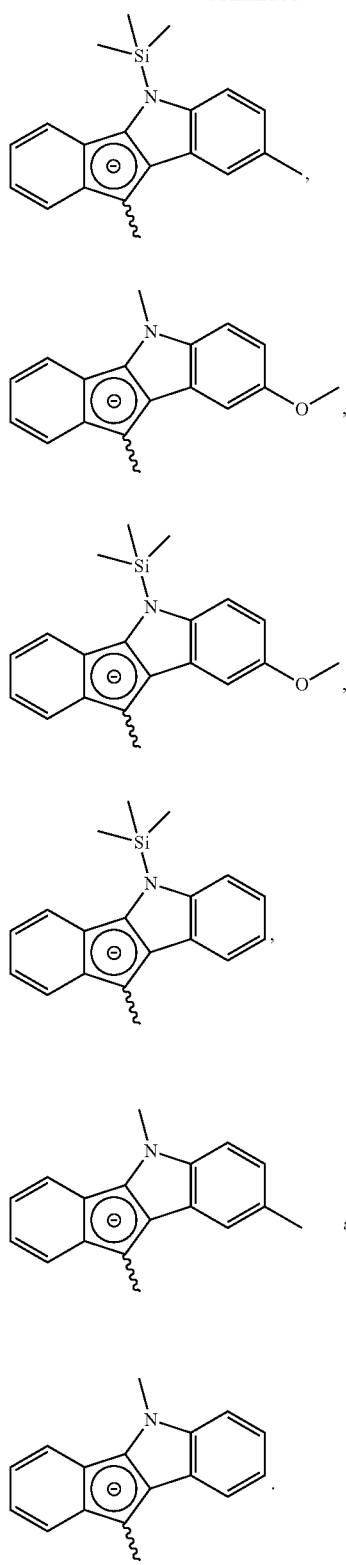
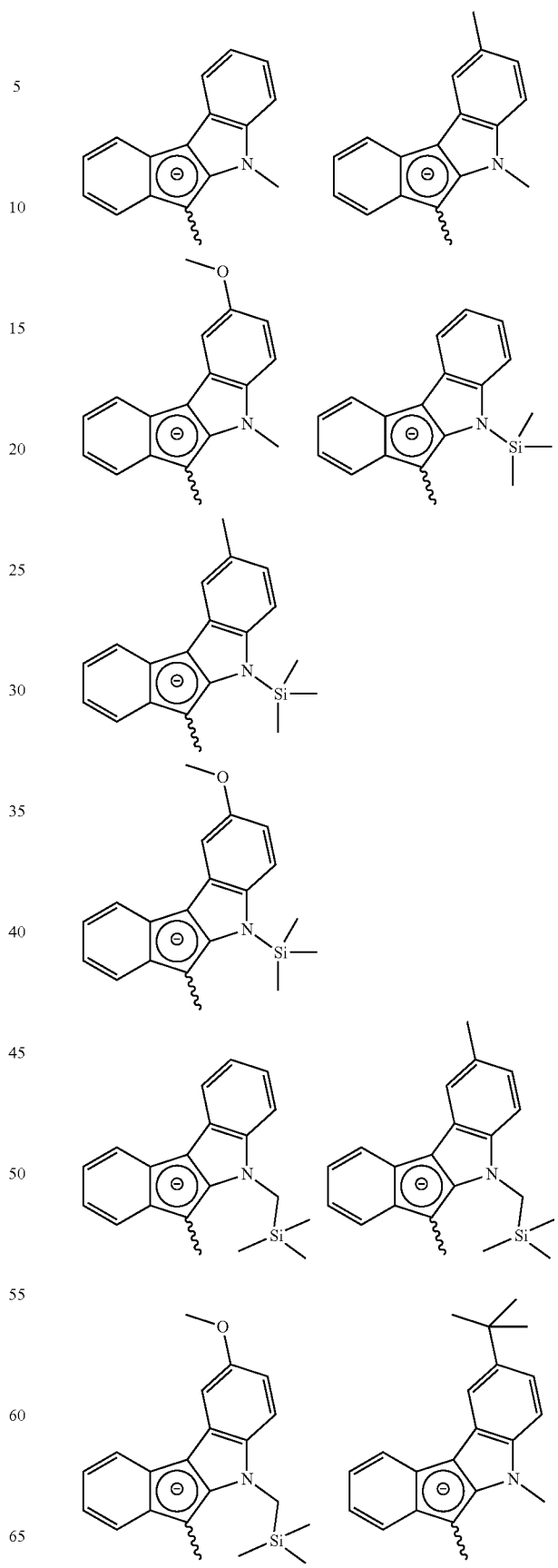
According to one embodiment of the present invention, a specific example of the compound represented by Chemical Formula 2b may include a compound represented by one of the following structural formulas, but the present invention is limited thereto.

-continued

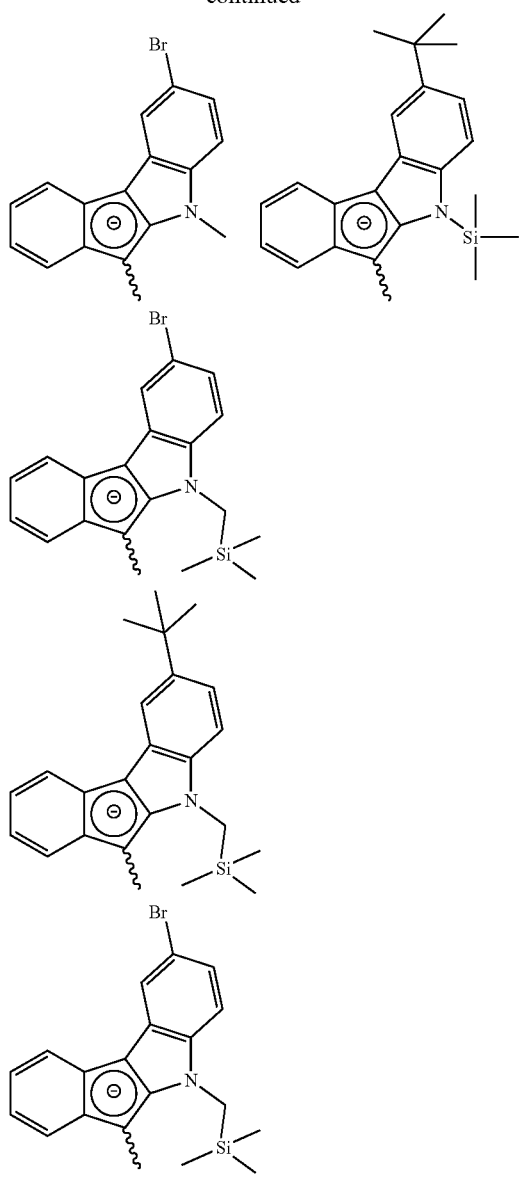

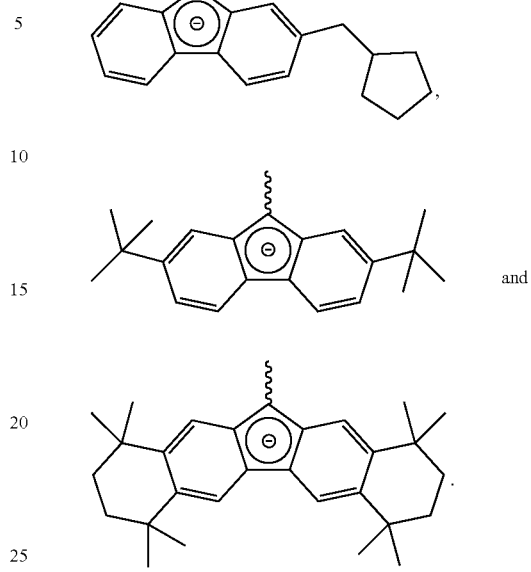

According to one embodiment of the present invention, a specific example of the first metallocene compound represented by Chemical Formula 1 may include a compound represented by one of the following structural formulas, but the present invention is limited thereto.

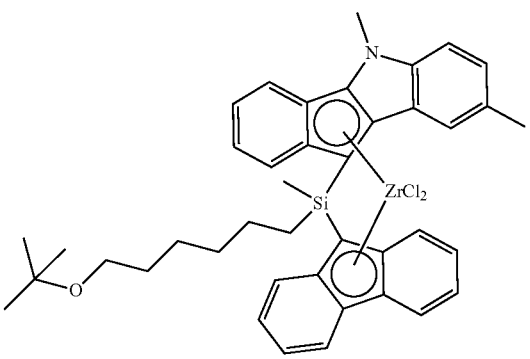

and

According to one embodiment of the present invention, a specific example of the compound represented by Chemical Formula 2c may include a compound represented by one of the following structural formulas, but the present invention is limited thereto.

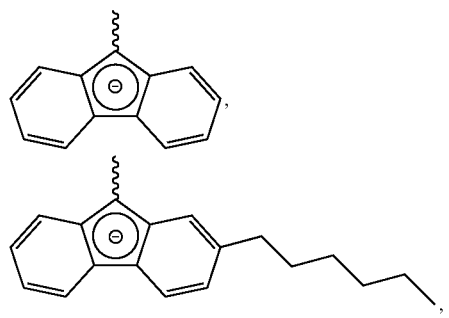

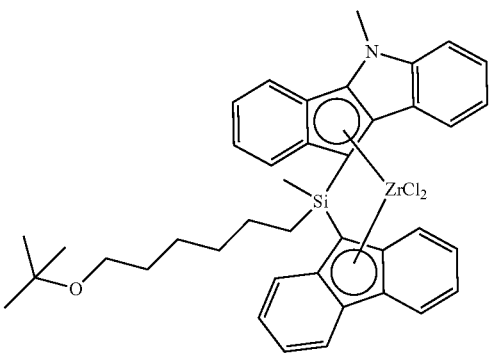

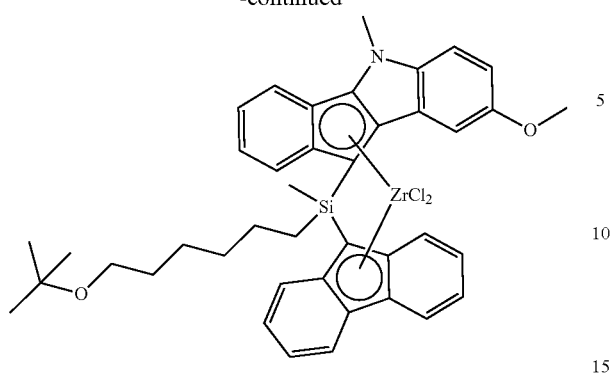
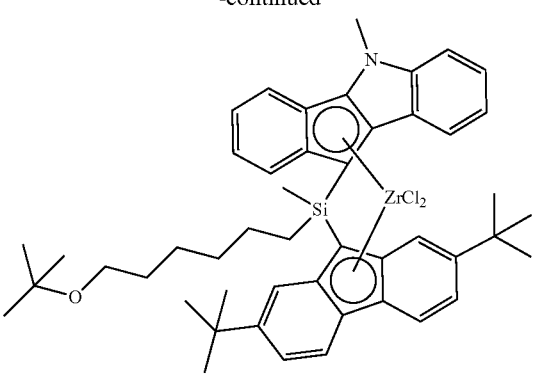
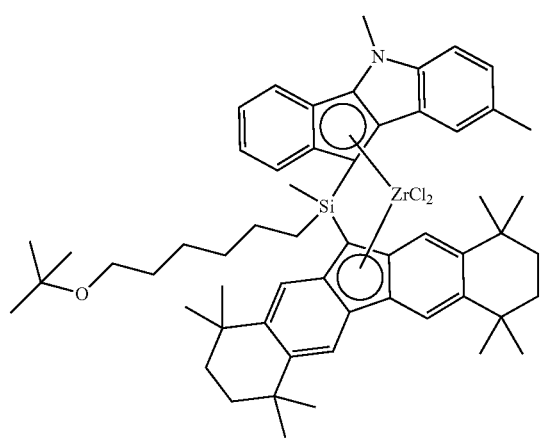
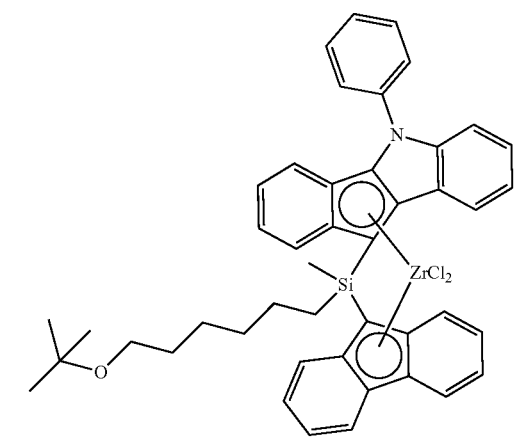
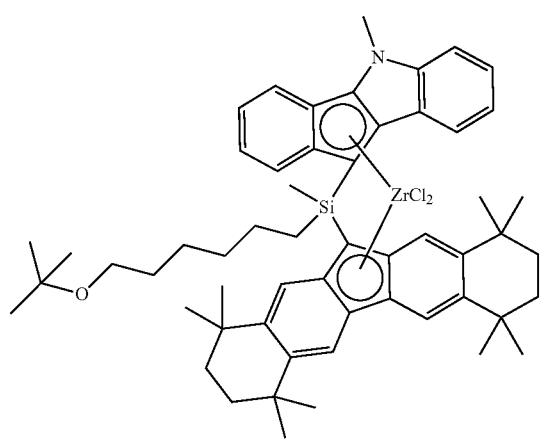
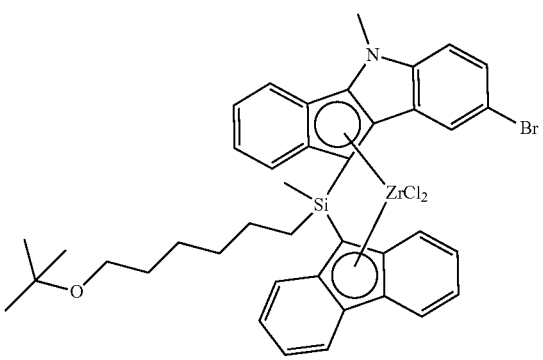
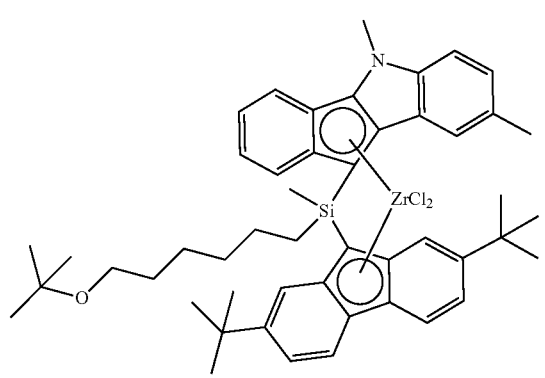
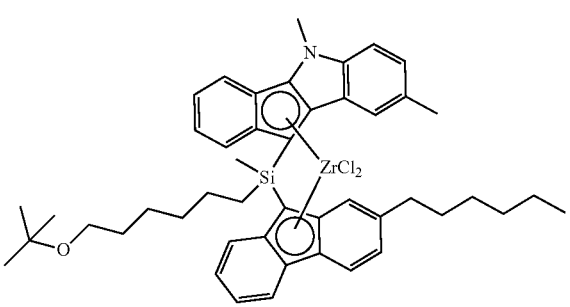

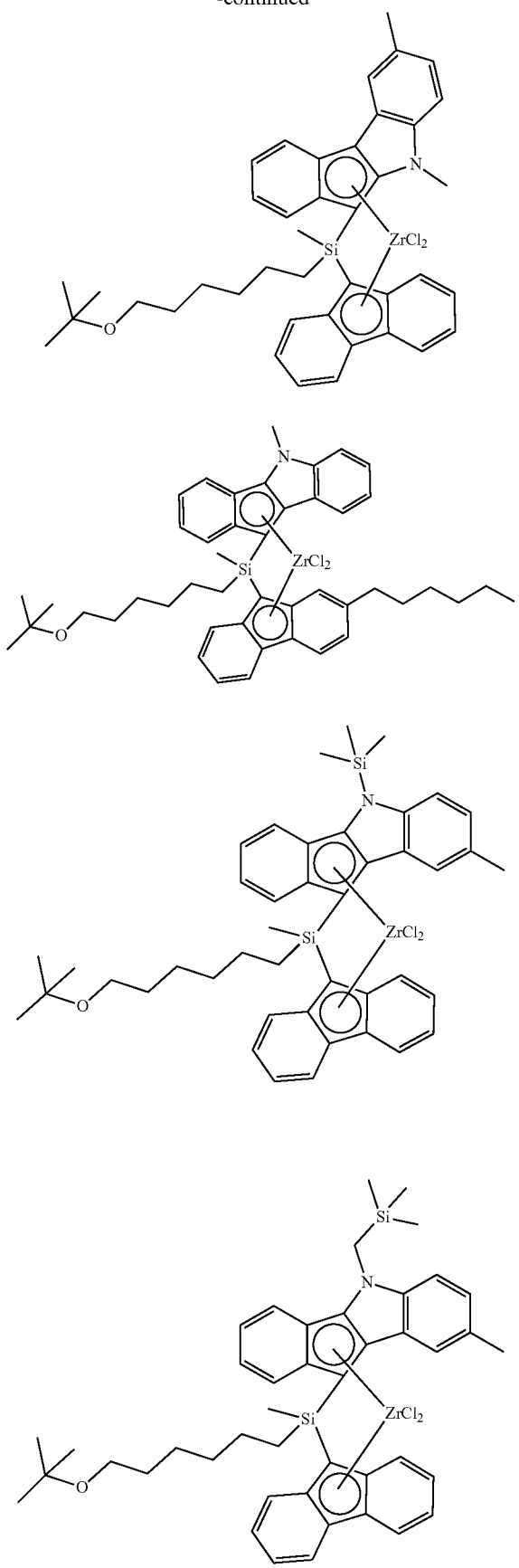
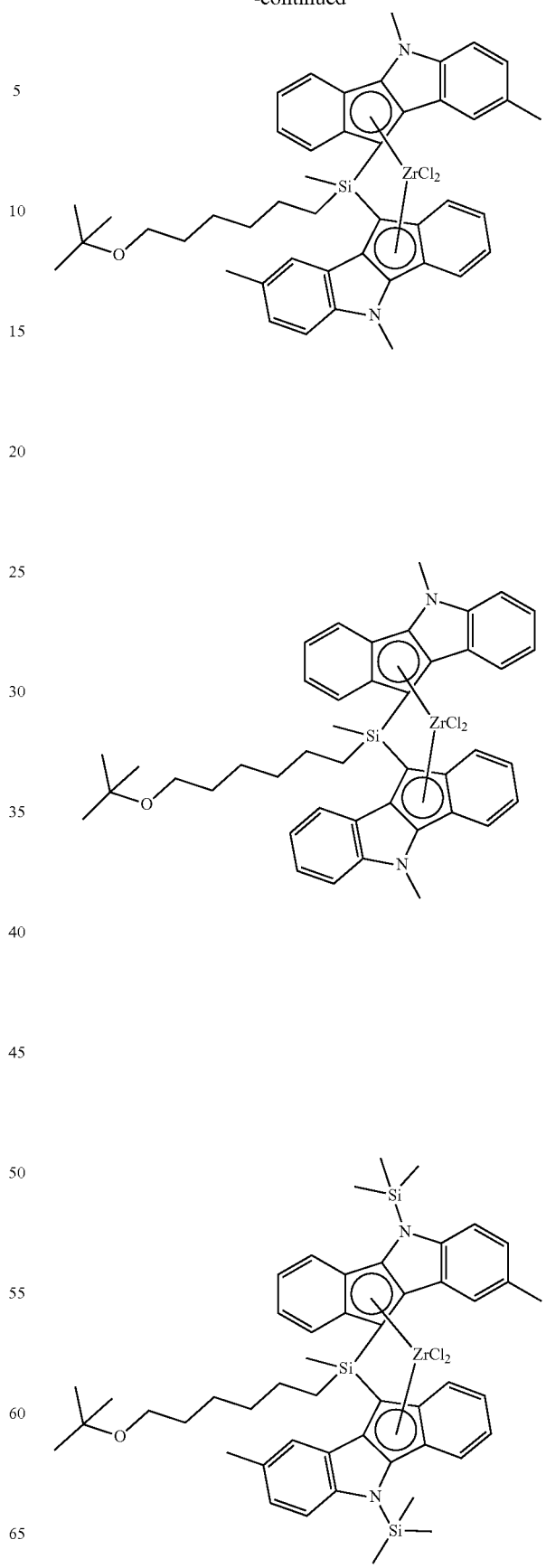

-continued

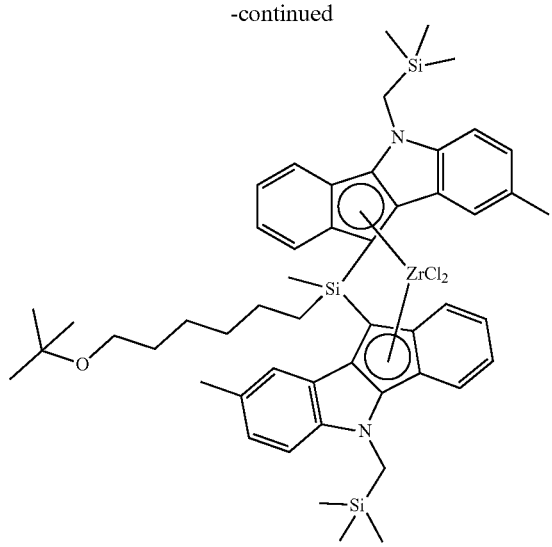

and

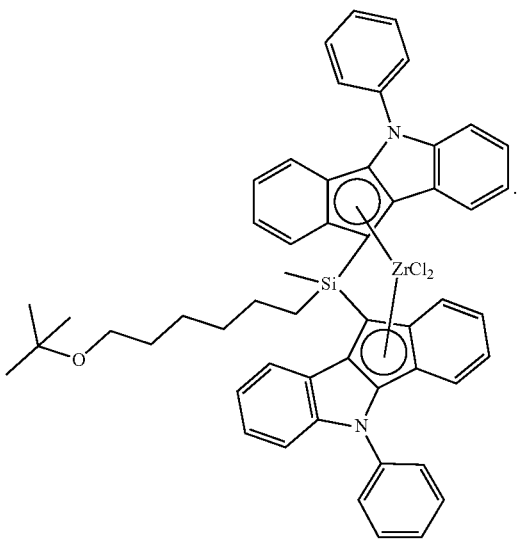

The first metallocene compound of Chemical Formula 1 has a superior activity and can polymerize an olefinic copolymer having a high molecular weight. In particular, it can exhibit a high polymerization activity even when it is used in the state of being supported on a support, and thus can produce a polyolefin-based copolymer having a ultra-high molecular weight.

Further, even when the polymerization reaction is carried out in the presence of hydrogen in order to produce an olefinic copolymer having both a high molecular weight and a broad molecular weight distribution, the first metallocene compound of Chemical Formula 1 according to the present invention exhibits a low hydrogen reactivity and thus can still polymerize an olefinic copolymer having an ultra-high molecular weight with a high activity. Therefore, even when it is used as a hybrid with a catalyst having different characteristics, it is possible to produce an olefinic copolymer satisfying the characteristics of high molecular weight without lowering the activity, resulting in the easy preparation of an olefinic copolymer having broad molecular weight distribution while containing the olefinic copolymer having high molecular weight.

The first metallocene compound of Chemical Formula 1 can be obtained by connecting an indenoindole derivative and/or a fluorene derivative via a bridging compound to prepare a ligand compound, then introducing a metal precursor compound therein to perform a metallation. The method for producing the first metallocene compound will be specifically explained in the examples to be described below.

The second metallocene compound represented by Chemical Formula 3 can be, for example, a compound represented by one of the following structural formulas, but is not limited thereto.

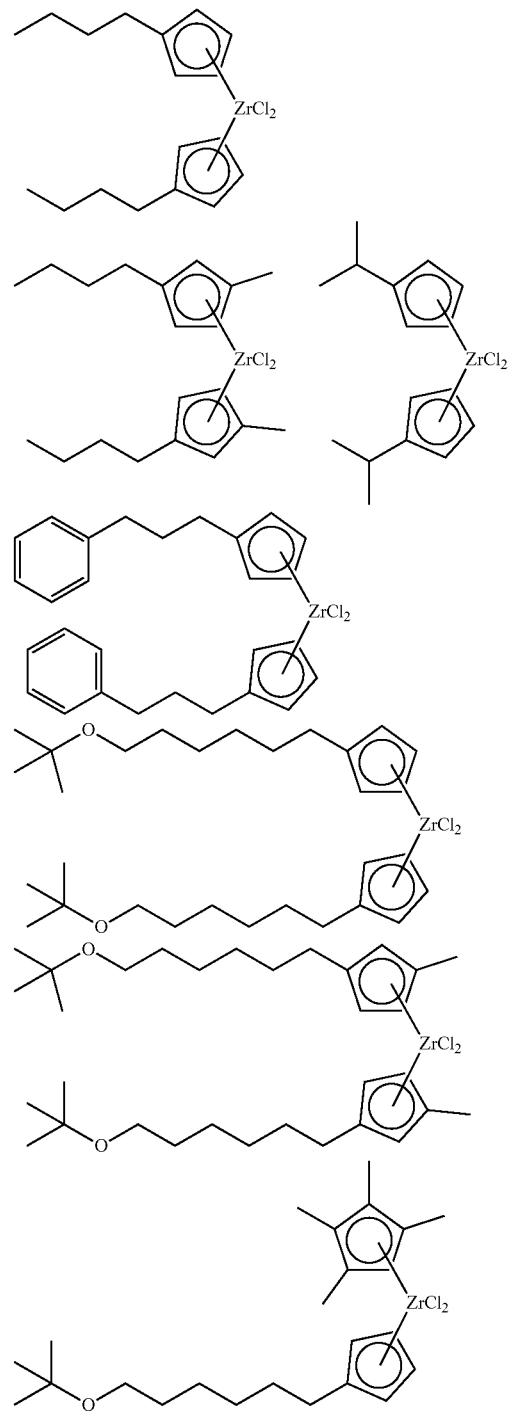

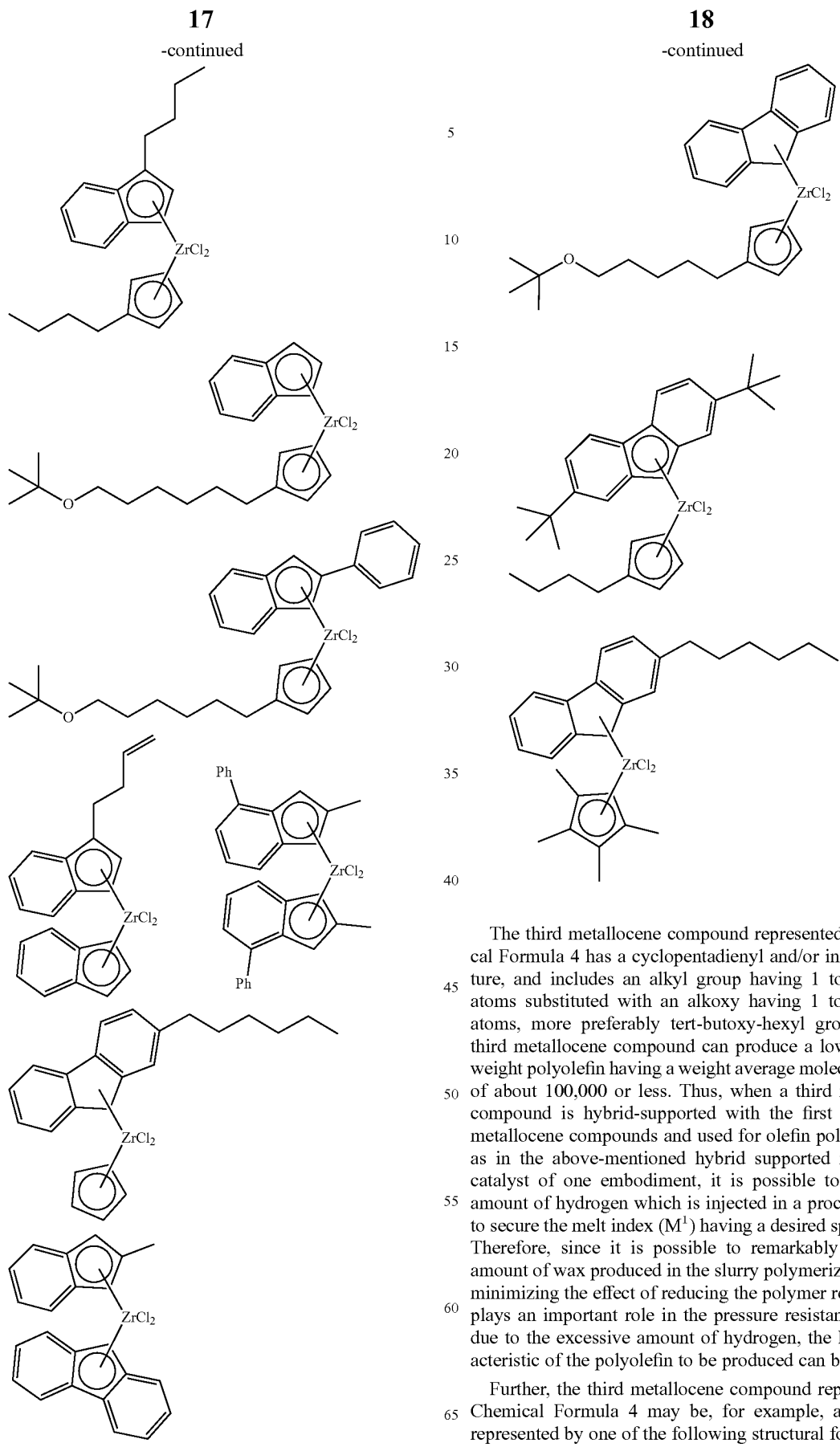

The third metallocene compound represented by Chemical Formula 4 has a cyclopentadienyl and/or indenyl structure, and includes an alkyl group having 1 to 20 carbon atoms substituted with an alkoxy having 1 to 20 carbon atoms, more preferably tert-butoxy-hexyl group. Such a third metallocene compound can produce a low molecular weight polyolefin having a weight average molecular weight of about 100,000 or less. Thus, when a third metallocene compound is hybrid-supported with the first and second metallocene compounds and used for olefin polymerization as in the above-mentioned hybrid supported metallocene catalyst of one embodiment, it is possible to reduce the amount of hydrogen which is injected in a process in order to secure the melt index ($M^1$) having a desired specification. Therefore, since it is possible to remarkably reduce the amount of wax produced in the slurry polymerization, while minimizing the effect of reducing the polymer region which plays an important role in the pressure resistance property due to the excessive amount of hydrogen, the FNCT characteristic of the polyolefin to be produced can be improved.

Further, the third metallocene compound represented by Chemical Formula 4 may be, for example, a compound represented by one of the following structural formulas, but is not limited thereto.

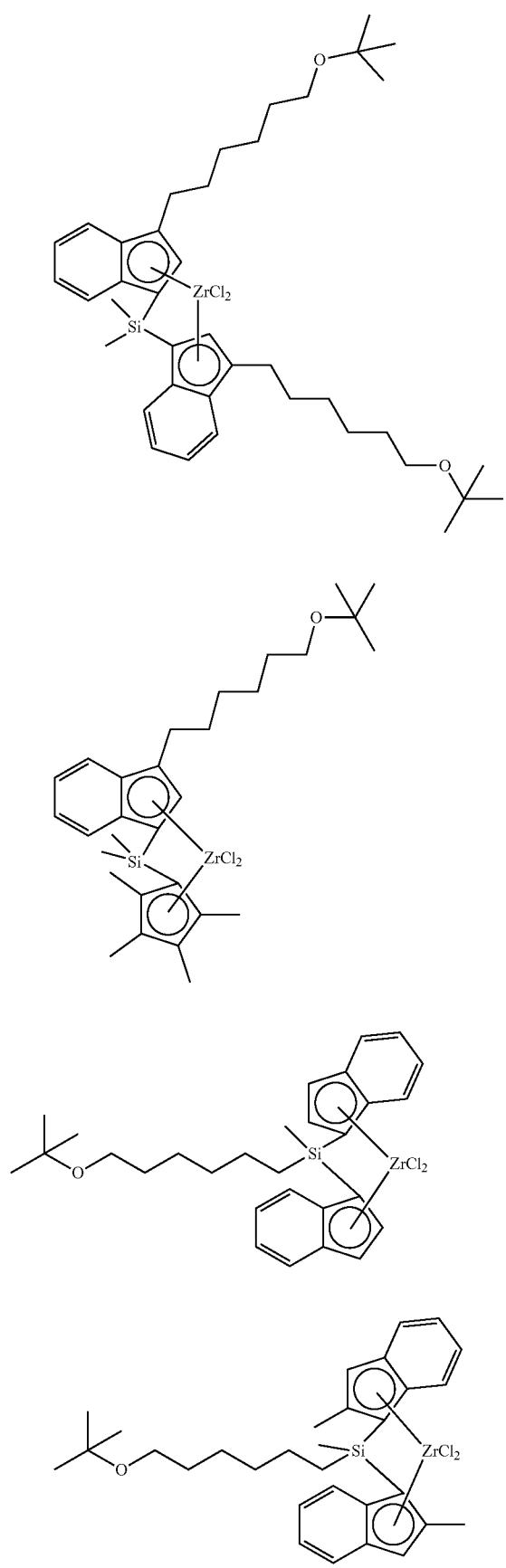

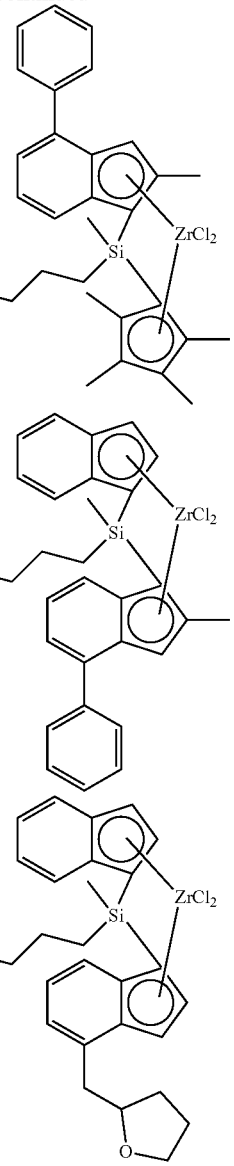

A hybrid supported metallocene catalyst according to the present invention is a catalyst in which one or more types of first metallocene compounds represented by Chemical Formula 1, one or more types of second metallocene compounds represented by Chemical Formula 3, and one or more types of third metallocene compounds represented by Chemical Formula 4 are hybrid-supported together with a cocatalyst compound on a support.

In the hybrid supported metallocene catalyst. The first metallocene compound represented by Chemical Formula 1 can contribute mainly to the production of high molecular weight copolymer having a high short chain branch (SCB) content, and the second metallocene compound represented by Chemical Formula 3 can contribute mainly to the production of a low molecular weight copolymer having a low SCB content. In addition, the third metallocene compound represented by Chemical Formula 4 may contribute to the production of a copolymer having a low molecular weight equal to or lower than that of the second metallocene compound.

As described above, as the hybrid supported metallocene catalyst according to the present invention includes at least three kinds of metallocene compounds which are different from each other, the molecular weight distribution is wide, which can contribute to ensuring a low molecular region necessary for the production of pipe type products and reducing the amount of wax produced in the process, thereby improving FNCT characteristics.

In the hybrid supported metallocene catalyst according to the present invention, the cocatalyst is supported together on the support to activate the metallocene compound is an organometallic compound containing a Group 13 metal, and is not particularly limited as long as it can be used when polymerizing an olefin in the presence of a general metallocene catalyst.

Specifically, the cocatalyst compound may include at least one of an aluminum-containing first cocatalyst of the following Chemical Formula 5 and a boron-containing second cocatalyst of the following Chemical Formula 6.

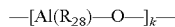
$$-[Al(R_{28})-O-]_k-$$ [Chemical Formula 5]

in Chemical Formula 5, each $R_{28}$ is independently halogen, a halogen-substituted or unsubstituted hydrocarbyl group having 1 to carbon atoms, and k is an integer of 2 or more,

$$T^+[BG_4]^-$$ [Chemical Formula 6]

in Chemical Formula 6, $T^+$ is a +1 valent polyatomic ion, B is boron in an oxidation state of +3, and G is each independently selected from the group consisting of a hydride group, a dialkylamido group, a halide group, an alkoxide group, an aryloxide group, a hydrocarbyl group, a halocarbyl group and a halo-substituted hydrocarbyl, wherein the G has 20 or less carbon atoms, provided that G is halide at one or less position.

By using the first and second cocatalysts, the molecular weight distribution of the finally produced polyolefin becomes more uniform, and thus the polymerization activity can be improved.

The first cocatalyst of Chemical Formula 5 may be an alkylaluminoxane-based compound wherein the repeating units are combined into a linear, circular or network form. Specific examples of the first cocatalyst include methylaluminoxane (MAO), ethylaluminoxane, isobutylaluminoxane, butylaluminoxane, and the like.

Further, the second cocatalyst of Chemical Formula 6 may be a trisubstituted ammonium salt, or a dialkylammonium salt, or a trisubstituted phosphate type borate compound. Specific examples of the second cocatalyst include a borate-based compound in the form of a trisubstituted ammonium salt, such as trimethylammonium tetraphenylborate, methyl dioctadecylammonium tetraphenylborate, triethylammonium tetraphenylborate, tripropylammonium tetraphenylborate, tri(n-butyl)ammonium tetraphenylborate, methyltetradecyloctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium, tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate or N,N-dimethyl-(2,4,6-trimethylanilinium)tetrakis-(2,3,4,6-tetrafluorophenyl)borate and the like; a borate-based compound in the form of a dialkylammonium salt, such as dioctadecylammonium tetrakis(pentafluorophenyl)borate, ditetradecylammonium tetrakis(pentafluorophenyl) borate or dicyclohexylammonium tetrakis(pentafluorophenyl)borate; or a borate-based compound in the form of a trisubstituted phosphonium salt, such as triphenylphosphonium tetrakis(pentafluorophenyl)borate, methyldioctadecylphosphonium tetrakis(pentafluorophenyl)borate or tri(2,6-dimethylphenyl)phosphonium tetrakis(pentafluorophenyl)borate.

In the hybrid supported metallocene catalyst according to the present invention, the weight ratio of the total transition metal contained in the first metallocene compound, the second metallocene compound and the third metallocene compound to the support may be 1:10 to 1:1000. When the support and the metallocene compound are contained within the above weight ratio, an optimal shape may be obtained.

The weight ratio of the cocatalyst compound to the support can be 1:1 to 1:100. Further, the weight ratio of the first metallocene compound represented by Chemical Formula 1 to the second metallocene compound represented by Chemical Formulas 3 to 5 may be from 10:1 to 1:10, preferably from 5:1 to 1:5. When the cocatalyst and the metallocene compound are contained within the above weight ratio, the activity and microstructure of the polymer may be optimized.

In the hybrid support catalyst according to the present invention, a support containing a hydroxy group on the surface can be used as the support, and preferably, a support containing a hydroxy group and a siloxane group having high reactivity, which is dried to remove moisture on its surface, can be used.

For example, silica, silica-alumina and silica-magnesia, and the like, which are dried at high temperature, may be used, and they may usually contain oxides, carbonates, sulfates, and nitrate components such as $Na_2O$, $K_2CO_3$, $BaSO_4$, and $Mg(NO_3)_2$.

The drying temperature of the support is preferably 200 to 800° C., more preferably 300 to 600° C., and most preferably 300 to 400° C. If the drying temperature of the support is lower than 200° C., it retains moisture too much so that moisture on the surface is reacted with the cocatalyst. If the drying temperature is higher than 800° C., pores on the surface of the support are combined with each other to reduce surface area, and many hydroxyl groups are lost on the surface to remain only siloxane groups. Thus, since the reactive sites with cocatalyst are reduced, it is not preferable.

The amount of hydroxyl group on the surface of the support is preferably 0.1 to 10 mmol/g, and more preferably 0.5 to 5 mmol/g. The amount of hydroxyl group on the surface of the support may be controlled depending on the preparation method and conditions of the support, or drying conditions such as temperature, time, vacuum, spray drying, and the like.

If the amount of hydroxyl group is less than 0.1 mmol/g, the reactive sites with cocatalyst are reduced. If the amount of hydroxyl group is more than 10 mmol/g, it is not desirable because it may be caused by moisture besides the hydroxyl groups present on the surface of support particles.

The hybrid supported metallocene catalyst according to the present invention can itself be used for the polymerization of olefinic monomers. Further, the hybrid supported metallocene catalyst according to the present invention may also be produced and used as a prepolymerized catalyst by contact reaction with an olefinic monomer. For example, the catalyst may be produced as a prepolymerized catalyst by separately contacting the catalyst with an olefinic monomer such as ethylene, propylene, 1-butene, 1-hexene, 1-octene or the like.

Meanwhile, according to another embodiment of the present invention, there may be provided a method for producing a polyolefin comprising the step of polymerizing an olefin monomer in the presence of the hybrid supported metallocene catalyst.

Examples of olefin monomers polymerizable with the hybrid supported metallocene catalyst include ethylene, alpha-olefin, cyclic olefin, or the like, and diene olefinic monomers or triene olefinic monomers having two or more double bonds can also be polymerized. Specific examples of the monomers may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, etc., and these monomers may be copolymerized by mixing two or more thereof. When the olefin polymer is a copolymer of ethylene and another comonomer, the comonomer may be preferably at least one comonomer selected from the group consisting of propylene, 1-butene, 1-hexene, 4-methyl-1-pentene and 1-octene. More specifically, it may be 1-butene or 1-hexene.

For the polymerization reaction of the above olefin monomer, various polymerization processes that are known as a polymerization reaction of olefin monomer such as a continuous solution polymerization process, a bulk polymerization process, a suspension polymerization process, a slurry polymerization process, or an emulsion polymerization process can be employed. Such polymerization can be carried out at a temperature of about 50 to about 110° C. or about 60 to about 100° C. and a pressure of about 1 to 100 bar or about 10 to 80 bar.

In addition, in the polymerization reaction, the hybrid supported catalyst can be used in a state of being dissolved or diluted in a solvent such as pentane, hexane, heptane, nonane, decane, toluene, benzene, dichloromethane, chlorobenzene, or the like. At this time, by treating the solvent with a small amount of alkyl aluminum or the like, a small amount of water or air which can adversely affects the catalyst can be removed beforehand.

By using the hybrid supported metallocene catalyst according to the present invention, not only the amount of wax produced during polymerization of the olefin monomer can be remarkably reduced, but also the FNCT characteristics of the produced polyolefin can be improved.

BRIEF DESCRIPTION OF THE DRAWINGS

The FIG. 1s a process diagram schematically showing a method of producing a polyolefin according to an embodiment of the present invention.

DETAILED DESCRIPTION OF THE EMBODIMENTS

Hereinafter, the invention will be described in more detail by way of examples. However, these examples are given for illustrative purposes only and the scope of the present invention is not limited by the examples.

Preparation Example of First Metallocene Compound

Preparation Example 1

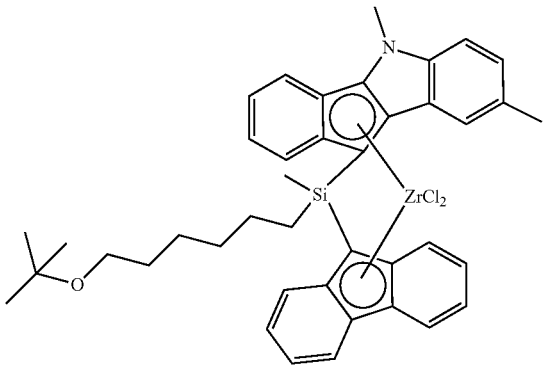

1-1. Preparation of Ligand Compound 2 g of fluorene was dissolved in 5 mL of MTBE and 100 mL of hexane, and 5.5 mL of 2.5 M n-BuLi hexane solution was added dropwise in a dry ice/acetone bath and stirred at room temperature overnight. 3.6 g of (6-(tert-butoxy)hexyl) dichloro(methyl)silane was dissolved in 50 mL of hexane, and fluorene-Li slurry was transferred thereto under a dry ice/acetone bath for 30 minutes and the solution was stirred at room temperature overnight. At the same time, 5,8-dimethyl-5,10-dihydroindeno[1,2-b]indole (12 mmol, 2.8 g) was dissolved in 60 mL of THF, and 5.5 mL of 2.5 M n-BuLi hexane solution was added dropwise in a dry ice/acetone bath, and the solution was stirred at room temperature overnight. After confirming the completion of the reaction by NMR sampling of a reaction solution of fluorene and (6-(tert-butoxy)hexyl)dichloro(methyl)silane, 5,8-dimethyl-5,10-dihydroindeno[1,2-b]indole-Li solution was transferred under dry ice/acetone bath and then stirred at room temperature overnight. After the reaction, the solution was extracted with ether/water and residual moisture of the organic layer was removed with $MgSO_4$, thereby obtaining two ligands (Mw 597.90, 12 mmol). It was confirmed by 1H-NMR that two isomers were produced.

$^1$H NMR (500 MHz, d6-benzene): −0.30~−0.18 (3H, d), 0.40 (2H, m), 0.65~1.45 (8H, m), 1.12 (9H, d), 2.36~2.40 (3H, d), 3.17 (2H, m), 3.41~3.43 (3H, d), 4.17~4.21 (1H, d), 4.34~4.38 (1H, d), 6.90~7.80 (15H, m)

1-2. Preparation of Metallocene Compound 7.2 g (12 mmol) of the ligand compound synthesized in 1-1 above was dissolved in 50 mL of diethylether, and 11.5 mL of 2.5 M n-BuLi hexane solution was added dropwise thereto in a dry ice/acetone bath and stirred at room temperature overnight. The solution was dried under vacuum to obtain a brown-colored sticky oil, which was then dissolved in toluene to obtain a slurry. $ZrCl_4(THF)_2$ was prepared and 50 mL of toluene was added thereto to prepare a slurry. 50 mL toluene slurry of $ZrCl_4(THF)_2$ was transferred in a dry ice/acetone bath. It was changed to violet color by stirring at room temperature overnight. The reaction solution was filtered to remove LiCl. The filtrate was dried under vacuum to remove toluene, to which hexane was added and subjected to sonication for 1 hour. The slurry was filtered to obtain 6 g of a dark violet-colored metallocene compound as a filtered solid (Mw 758.02, 7.92 mmol, yield 66 mol %). Two isomers were observed by 1H-NMR.

$^1$H NMR (500 MHz, $CDCl_3$): 1.19 (9H, d), 1.71 (3H, d), 1.50~1.70 (4H, m), 1.79 (2H, m), 1.98~2.19 (4H, m), 2.58 (3H, s), 3.38 (2H, m), 3.91 (3H, d), 6.66~7.88 (15H, m)

Preparation Example 2

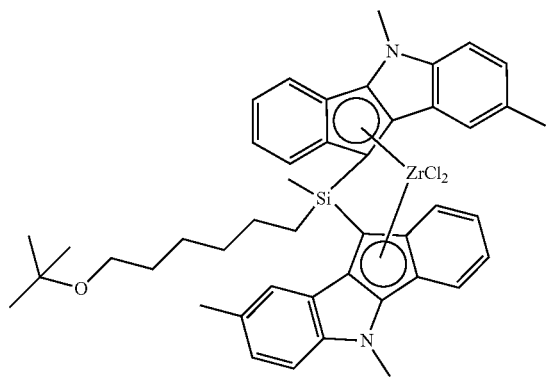

2-1. Preparation of Ligand Compound 2.63 g (12 mmol) of 5-methyl-5,1 hydroindeno [1,2-b] indole was added to a 250 mL flask and dissolved in in 50 mL of THF. Then, 6 mL of 2.5 M n-BuLi hexane solution was added dropwise to dry ice/acetone bath, and the mixture was stirred at room temperature overnight. In another 250 mL flask, 1.62 g (6 mmol) of (6-(tert-butoxy)hexyl)dichloro (methyl)silane was dissolved in 100 mL of hexane, and then the solution was slowly added dropwise to a lithiated solution of 5-methyl-5,10-dihydroindeno[1,2-b]indole and the solution was stirred at room temperature overnight. After the reaction, the solution was extracted with ether/water and residual moisture of the organic layer was removed with $MgSO_4$, and dried under vacuum to obtain 3.82 g (6 mmol) of a ligand compound, which was confirmed by 1H-NMR.

$^1$H NMR (500 MHz, $CDCl_3$): −0.33 (3H, m), 0.86~1.53 (10H, m), 1.16 (9H, d), 3.18 (2H, m), 4.07 (3H, d), 4.12 (3H, d), 4.17 (1H, d), 4.25 (1H, d), 6.95~7.92 (16H, m)

2-2. Preparation of Metallocene Compound 3.82 g (6 mmol) of the ligand compound synthesized in 2-1 above was dissolved in 100 mL of toluene and 5 mL of MTBE, and then 5.6 mL (14 mmol) of 2.5 M n-BuLi hexane solution was added dropwise thereto in a dry ice/acetone bath and stirred at room temperature overnight. In another flask, 22.26 g (6 mmol) of $ZrCl_4(THF)_2$ was prepared and 100 ml of toluene was added to prepare a slurry. The toluene slurry of $ZrCl_4(THF)_2$ was transferred to the lithiated ligand under a dry ice/acetone bath. The mixture was stirred at room temperature overnight and changed to violet color.

After filtering the reaction solution to remove LiCl, the resulting filtrate was dried under vacuum and hexane was added and subjected to sonication. The slurry was filtered to obtain 3.40 g (yield 71.1 mol %) of dark violet metallocene compound as a filtered solid.

$^1$H NMR (500 MHz, $CDCl_3$): 1.74 (3H, d), 0.85~2.33 (10H, m), 1.29 (9H, d), 3.87 (3H, s), 3.92 (3H, s), 3.36 (2H, m), 6.48~8.10 (16H, m)

Preparation Example of Second Metallocene Compound

Preparation Example 3

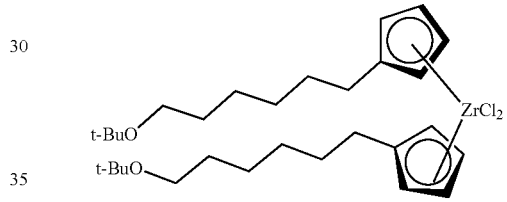

t-Butyl-O—$(CH_2)_6$-Cl was prepared using 6-chlorohexanol by a method described in Tetrahedron Lett. 2951 (1988), and NaCp was reacted therewith to obtain t-Butyl-O—$(CH_2)_6$—$C_5H_5$ (yield 60%, b.p. 80° C./0.1 mmHg).

Further, t-Butyl-O—$(CH_2)_6$—$C_5H_5$ was dissolved in THF at −78° C., and normal butyllithium (n-BuLi) was slowly added thereto. The temperature was raised to room temperature, and the solution was reacted for 8 hours. The previously synthesized lithium salt solution was slowly added again to a suspension of $ZrCl_4(THF)_2$ (1.70 g, 4.50 mmol)/THF (30 ml) at −78° C. and then further reacted at room temperature for 6 hours.

All volatile materials were dried under vacuum, and hexane solvent was added to the obtained oily liquid material and filtered. The filtered solution was dried under vacuum, and then hexane was added thereto to induce precipitation at a low temperature (−20° C.). The obtained precipitate was filtered off at a low temperature to obtain a compound [tBu-O—$(CH_2)_6$—$C_5H_4]_2ZrCl_2$ in the form of a white solid (yield: 92%).

$^1$H NMR (300 MHz, $CDCl_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C NMR ($CDCl_3$): 135.09, 116.66, 112.28, 72.42, 61.52, 30.66, 30.61, 30.14, 29.18, 27.58, 26.00.

Preparation Example of Third Metallocene Compound

Preparation Example 4

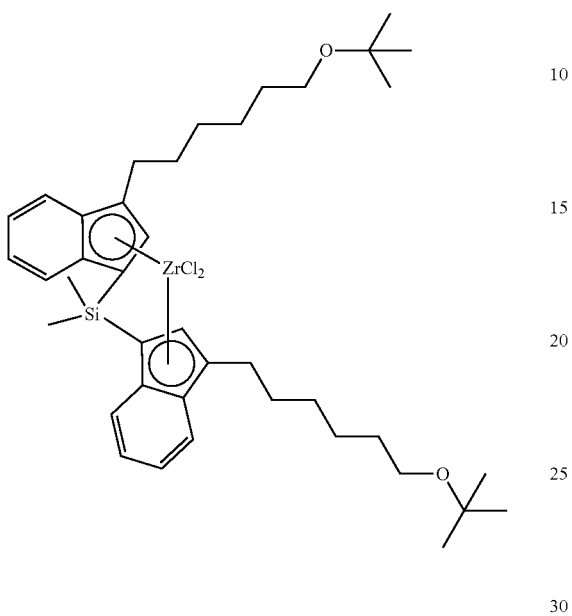

4-1. Preparation of Ligand Compound 102.54 g (376.69 mmol) of 3-tether indene was added to a dried 1 L Schlenk flask and 450 ml of THF was introduced thereto under argon. The solution was cooled to −30° C., and then 173.3 ml (119.56 g, d=0.690 g/ml) of 2.5 M nBuLi hexane solution was added dropwise. The reaction mixture was slowly warmed up to room temperature and stirred until the next day. After this lithiated 3-thether indene solution was cooled to −78° C., 24.3 g (188.3 mmol) of dimethyldichlorosilicone was prepared and added dropwise to the Schlenk flask. The added mixture was slowly warmed up to room temperature and stirred for one day, and 200 ml of water was added to a flask and quenched. The organic layer was separated and dried with MgSO$_4$. Thereby, 115 g (191.4 mmol, 101.6%) of a yellow oil was obtained.

NMR standard purity (wt %)=100%. Mw=600.99. 1H NMR (500 MHz, CDCl$_3$): −0.53, −0.35, −0.09 (6H, t), 1.18 (18H, m), 1.41 (8H, m), 1.54 (4H, m), 1.68 (4H, m), 2.58 (4H, m), 3.32 (4H, m), 6.04 (1H, s), 6.26 (1H, s), 7.16 (2H, m), 7.28 (3H, m), 7.41 (3H, m).

4-2. Preparation of Metallocene Compound 191.35 mmol of the ligand compound synthesized in 3-1 above was added to a 2 L Schlenk flask dried in an oven, and 4 equivalents of MTBE (67.5 g, d=0.7404 g/ml) and 696 g of toluene (d=0.87 g/ml) solution were dissolved in a solvent. Then, 2.1 equivalents of nBuLi solution (160.7 ml) was added and was subjected to lithiation until the next day. 72.187 g (191.35 mmol) of ZrCl$_4$(THF)$_2$ was taken in a glove box and put in a 2 L Schlenk flask and a toluene-containing suspension was prepared. The above two flasks were cooled to −78° C. and then ligand anion was slowly added to a Zr suspension. After the addition was completed, the temperature of the reaction mixture was slowly increased to room temperature. After stirring overnight, the slurry was filtered under argon. Both the filtered solid and the filtrate were evaporated under vacuum-pressure. From 115 g (191.35 mmol) of the ligand, 150.0 g (198 mmol, >99%) of the catalyst precursor was obtained as filtrate and stored in toluene solution (1.9446 g/mmol).

NMR standard purity (wt %)=100%. Mw=641.05. 1H NMR (500 MHz, CDCl$_3$): 0.87 (6H, m), 1.14 (18H, m), 1.11-1.59 (16H, m), 2.61, 2.81 (4H, m), 3.30 (4H, m), 5.54 (1H, s), 5.74 (1H, s), 6.88 (1H, m), 7.02 (1H, m), 7.28 (1H, m), 7.39 (1H, d), 7.47 (1H, t), 7.60-7.71 (1H, m).

Preparation Example 5

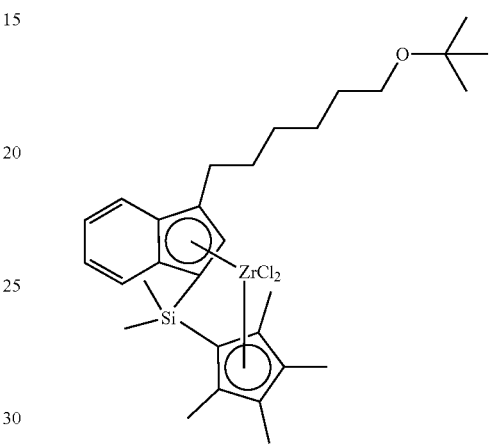

5-1. Preparation of Ligand Compound (1) Synthesis of Chlorodimethyl(TMCp)Silane (CDMTS)

6.0 ml (40 mmol) of TMCP was dissolved in 60 ml of dry THF (60 ml) in a dried 250 ml Schlenk flask and then the solution was cooled to −78° C. 17 ml (42 mmol) of n-BuLi 2.5M hexane solution was slowly added dropwise, and the mixture was stirred at room temperature overnight. 4.8 m (140 mmol) of dichlorodimethylsilane was dissolved in n-hexane in another 250-mL Schlenk flask and cooled to −78° C., and then the TMCP-lithiation solution previously reacted was slowly added. It was stirred at room temperature overnight, and the solvent was removed under reduced pressure. The resulting product was dissolved in toluene and filtered to remove the remaining LiCl, thereby obtaining 7.0 g (33 mmol) of a yellow liquid (yield 83%).

1H NMR (500 MHz, CDCl$_3$): 0.24 (6H, s), 1.82 (6H, s), 1.98 (6H, s), 3.08 (1H, s).

(2) After 2.72 g (10 mmol) of 3-(6-(tert-butoxy) hexyl)-1H-indene (T-Ind) was dissolved in 50 mL of THF in a dried 250 mL Schlenk flask, 8.2 ml (20.4 mmol) of n-BuLi 2.5 M hexane solution was slowly added dropwise in a dry ice/acetone bath. The solution was reacted at room temperature overnight to obtain a red solution. 2.15 g (10 mmol) of CDMTS previously synthesized was dissolved in THF in another 250 mL Schlenk flask, and then the T-Ind-Li solution was subjected to dropwise feeding in a dry ice/acetone bath. After the solution was reacted at room temperature overnight, a dark brown slurry was confirmed, which was quenched with water and extracted with ether to obtain 4.18 g (9.27 mmol) of a desired compound (yield 92.7%).

1H NMR (500 MHz, CDCl$_3$): 0.43 (3H, s), −0.15 (3H, s), 1.21 (9H, s), 1.42-2.08 (22H, m), 2.61 (1H, s), 3.35-3.38 (2H, m), 3.52 (1H, s), 6.21 (1H, s), 7.17-7.43 (4H, m).

4-2. Preparation of Metallocene Compound 4.18 g (9.27 mmol) of the ligand compound synthesized in 5-1 above was dissolved in 100 ml of toluene, and 4.4 ml (4 equivalents) of MTBE was further added thereto. To the obtained solution was added dropwise 8.2 ml (20.4 mmol) of n-BuLi 2.5 M hexane solution in a dry ice/acetone bath. The solution was reacted at room temperature overnight to obtain a reddish slurry. 3.50 g (9.27 mmol) of $ZrCl_4(THF)_2$ was prepared in a glove box and 50 ml of toluene solution was prepared, to which the ligand-Li solution was subjected to dropwise feeding in in a dry ice/acetone bath. After the solution was reacted at room temperature overnight, a reddish slurry was identified. The slurry was filtered to remove LiCl, which toluene was vacuum dried to about 90% and recrystallized with hexane. The slurry was filtered to obtain 2.5 g (4.1 mmol) of a yellow filter cake (yield 44.1%).

1H NMR (500 MHz, $CDCl_3$): 0.93 (3H, s), 1.17 (12H, s), 1.37-1.63 (8H, m), 2.81-2.87 (1H, m), 2.93-2.97 (1H, m), 3.29-3.31 (2H, t), 5.55 (1H, s), 7.02-7.57 (4H, m)

Preparation Example 6

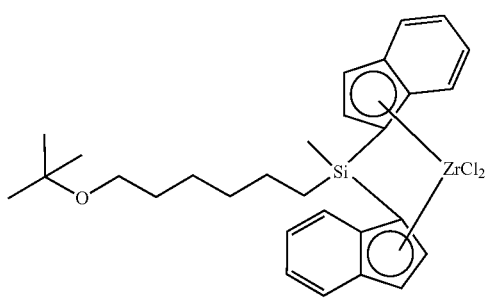

6-1. Preparation of Ligand Compound 27.88 g (240 mmol) of Indene was added to a dried 250 mL Schlenk flask and 800 mL of MTBE was added under argon. After the solution was cooled to 0° C., 115.2 ml (288 mmol, d=0.690 g/ml) of 2.5 M nBuLi hexane solution was added dropwise. The reaction mixture was slowly warmed up to room temperature and stirred until the next day. Since the remaining nBuLi with increased purity may affect the next reaction, all the solvent MTBE was evaporated and Indene Li salt was added using a Schlenk filter under argon and then dissolved in 600 ml of THF solvent. A solution of 25.09 g (92.48 mmol) of Silicon Tether and 700 ml of THF was prepared in another 2 L Schlenk flask, and the Schlenk flask was cooled to −78° C., and then the lithiated solution was added dropwise. The added mixture was stirred at room temperature for one day, quenched by adding 400 ml of water into the flask, and the organic layer was separated and dried over $MgSO_4$. Thereby, 35.41 g (82.2 mmol, 88.9%) of a yellow oil was obtained.

NMR standard purity (wt %)=100%. Mw=430.70. 1H NMR (500 MHz, $CDCl_3$): −0.45, −0.22, −0.07, 0.54 (total 3H, s), 0.87 (1H, m), 1.13 (9H, m), 1.16-1.46 (10H, m), 3.25 (2H, m), 3.57 (1H, m), 6.75, 6.85, 6.90, 7.11, 7.12, 7.19 (total 4H, m), 7.22-7.45 (4H, m), 7.48-7.51 (4H, m).

6-2. Preparation of Metallocene Compound

The ligand compound synthesized in 6-1 above was added a 1 L Schlenk flask dried in an oven and then dissolved in diethylether. Then, 2.1 equivalents of nBuLi solution was added and subjected lithiation until the next day. 2.1 equivalents of $ZrCl_4(THF)_2$ was taken in a glove box and added to a 2 L Schlenk flask and a diethylether-containing suspension was prepared. The above two flasks were cooled to −78° C. and ligand anion was slowly added to the Zr suspension. After the addition was completed, the temperature of the reaction mixture was slowly increased to room temperature. After stirring overnight, the ether in the mixture was subjected to a vacuum-reduced pressure to remove the solvent. Hexane was added in volume as much as the previous solvent. In this case, the reason for adding hexane is that the synthesized catalyst precursor has reduced solubility in hexane and promotes crystallization. The hexane slurry was filtered under argon. Then, both the filtered solid and the filtrate were evaporated under vacuum-pressure. The filter cake and the filtrate each were confirmed by NMR whether to synthesize the catalyst, respectively, and the yield and purity were confirmed by weighing and sampling in the glove box. From 35.41 g (82.2 mmol) of a ligand, 36.28 g (77.1 mmol, 93.8%) of a red solid was obtained as a filter cake.

NMR purity standard (wt %)=100%. Mw=470.76. 1H NMR (500 MHz, $CDCl_3$): 0.88 (3H, m), 1.15 (9H, m), 1.17-1.47 (10H, m), 1.53 (4H, d), 1.63 (3H, m), 1.81 (1H, m), 6.12 (2H, m), 7.15 (2H, m), 7.22-7.59 (8H, m)

Preparation Example of Hybrid Supported Catalyst

Example 1

1-1. Driving of Support

Silica (SYLOPOL 948, manufactured by Grace Davison) was dehydrated in a vacuum state at a temperature of 400° C. for 12 hours.

1-2. Preparation of Supported Catalyst 100 ml of a toluene solution was added to a glass reactor at room temperature to which 10 g of the prepared silica was added, and then stirred while raising the temperature of the reactor to 40° C. After sufficiently dispersing the silica, 60.6 ml of a 10 wt % methylaluminoxane (MAO)/toluene solution was added, the temperature was raised to 80° C., and then the mixture was stirred at 200 rpm for 16 hours. After that, the temperature was again lowered to 40° C., followed by washing with a sufficient amount of toluene to remove unreacted aluminum compound. After 100 mL of toluene was again added, 0.5 mmol of the metallocene catalyst prepared in Preparation Example 4 was added and stirred for 1 hour. After completion of the reaction, 0.5 mmol of the metallocene catalyst prepared in Preparation Example 3 was added thereto and stirred for 1 hour. After completion of the reaction, 0.5 mmol of the metallocene catalyst prepared in Preparation Example 1 was added thereto and the mixture was stirred for 2 hours. After completion of the reaction, the stirring was stopped, the toluene layer was separated and removed, and the remaining toluene was removed by subjecting to a reduced pressure at 40° C. to prepare a supported catalyst.

Example 2

A supported catalyst was prepared in the same manner as in Example 1, except that 0.5 mmol of the metallocene catalyst prepared in Preparation Example 2 was used instead of the metallocene catalyst prepared in Preparation Example 1.

Example 3

A supported catalyst was prepared in the same manner as in Example 2, except that 0.5 mmol of the metallocene catalyst prepared in Preparation Example 5 was used instead of the metallocene catalyst prepared in Preparation Example 4.

Comparative Example 1

100 ml of a toluene solution was added to a glass reactor at room temperature, 10 g of the prepared silica was added, and the mixture was stirred while raising the temperature of the reactor to 40° C. After sufficiently dispersing the silica, 60.6 ml of 10 wt % methylaluminoxane (MAO)/toluene solution was added, the temperature was raised to 80° C., and then the mixture was stirred at 200 rpm for 16 hours. After that, the temperature was lowered again to 40° C., and the unreacted aluminum compound was removed by washing with a sufficient amount of toluene. After 100 mL of toluene was again added, 0.5 mmol of the metallocene catalyst prepared in Preparation Example 3 was added thereto, and the mixture was stirred for 1 hour. After completion of the reaction, 0.5 mmol of the metallocene catalyst prepared in Preparation Example 1 was added thereto and stirred for 2 hours. After completion of the reaction, the stirring was stopped, and the toluene layer was separated and removed. Thereafter, the remaining toluene was removed by subjecting to a reduced pressure at 40° C. to prepare a supported catalyst.

Comparative Example 2

A supported catalyst was prepared in the same manner as in Comparative Example 1, except that 0.5 mmol of the metallocene catalyst prepared in Preparation Example 2 was used instead of the metallocene catalyst prepared in Preparation Example 1.

Comparative Example 3

A supported catalyst was prepared in the same manner as in Comparative Example 2, except that 0.5 mmol of the metallocene catalyst prepared in Preparation Example 6 was used instead of the metallocene catalyst prepared in Preparation Example 3.

Comparative Example 4

A supported catalyst was prepared in the same manner as in Comparative Example 2, except that 0.5 mmol of the metallocene catalyst prepared in Preparation Example 4 was used instead of the metallocene catalyst prepared in Preparation Example 3.

Comparative Example 5

A supported catalyst was prepared in the same manner as in Comparative Example 2, except that 0.5 mmol of the metallocene catalyst prepared in Preparation Example 5 was used instead of the metallocene catalyst prepared in Preparation Example 3.

Test Example 1: Hydrogen/Ethylene Blending Polymerization (Semi-Batch Type)

30 mg of each of the supported catalysts prepared in Examples 1 to 3 and Comparative Examples 1 to 5 were weighed in a dry box and placed in a 50-mL glass bottle. The bottle was sealed with a rubber diaphragm, taken out of the dry box to prepare a catalyst for injection. Polymerization was performed in a 600 mL temperature-controllable metal alloy reactor which was equipped with a mechanical stirrer and used under a high pressure.

To this reactor, 1 L of hexane including 1.0 mmol triethylaluminum was injected, and the respective supported catalysts prepared above were introduced without contact with air. Then, polymerization was carried out for 1 hour at 80° C., while continuously providing a gaseous ethylene monomer at a pressure of Kgf/cm$^2$ and hydrogen gas at 0.7 vol % relative to ethylene monomer. The termination of the polymerization was completed by first stopping the stirring and then removing the ethylene by evacuation.

Most of the polymerization solvent was removed from the resulting polymer by filtration, and the polymer was dried in a vacuum oven at 80° C. for 4 hours.

The polymerization activity, MI, MFRR, and amount of wax produced of the polyolefin prepared above were measured according to the following criteria and the results are shown in Table 1 below.

1) MI (5): The weight of the melted polymer resin passing through a 2.1 mm orifice at 190° C. for 10 minutes under the condition of applying a force of 5 kg vertically to the gravity direction was measured according to ASTM D1238 standard.

2) MFRR (21.6/5): MFRR was measured by dividing the weight of the melted polymer resin passing through a 2.1 mm orifice at 190° C. for 10 minutes under the condition of applying a force of 21.6 kg vertically to the gravity direction by the weight of the melted polymer resin passing through a 2.1 mm orifice at 190° C. for 10 minutes under the condition of applying a force of 5 kg vertically to the gravity direction in the same way as in 1) above.

3) Amount of wax produced: The content of wax volume sunk by settling 100 cc of hexane in the process for 24 hours was measured.

TABLE 1

| | Activity (kgPE/gCat · 2 hr) | MI (5) | MFRR (21.6/5) | Amount of wax produced (cc) |
|---|---|---|---|---|
| Example 1-1 | 6.8 | 18.2 | — | 5 |
| Example 2-1 | 7.7 | 0.89 | 47 | 10 |
| Example 3-1 | 7.0 | 0.89 | 32 | 10 |
| Comparative Example 1-1 | 6.2 | 15.9 | — | 40 |
| Comparative Example 2-1 | 6.5 | 0.59 | 24 | 50 |
| Comparative Example 3-1 | 4.9 | 0.55 | 23 | 45 |
| Comparative Example 4-1 | 3.6 | 0.27 | 57 | 20 |
| Comparative Example 5-1 | 4.5 | 0.30 | 36 | 15 |

Test Example 2: Hydrogen/Ethylene Blending Polymerization (Continuous Batch System)

A multistage continuous CSTR reactor composed of two reactors with a capacity of 0.2 m$^3$ as shown in FIG. 1 was prepared.

The first reactor R1 was charged at a flow rate of 23 kg/hr of hexane, 7 kg/hr of ethylene, 2.0 g/hr of hydrogen, and 30 mmol/hr of triethylaluminum (TEAL), respectively. Also, the hybrid supported metallocene catalysts prepared in Examples 1 to 3 and Comparative Examples 1 and 2 were injected at 2 g/hr (170 μmol/hr). In this case, the first reactor was maintained at 80° C., the pressure was maintained at 8 bar, the residence time of the reactant was maintained at 2.5 hours, and the slurry mixture containing the polymer was continuously supplied to the second reactor while maintaining a constant liquid level in the reactor.

The second reactor (R2) was charged at a flow rate of 25 kg/hr of hexane, 6 kg/hr of ethylene, 15 cc/min of 1-butene and 30 mmol/hr of triethylaluminum (TEAL), and a hybrid supported metallocene catalyst according to Preparation Example 1 was injected at 2 g/hr (170 μmol/hr) and a molecular weight modifier (MwE) according to Preparation Example 2 were injected at 34 μmol/hr. The second reactor was maintained at 78° C., the pressure was maintained at 6 bar, the residence time of the reactants was maintained at 1.5 hours, and the polymer mixture was continuously supplied to a post reactor while maintaining a constant liquid level in the reactor.

The post reactor was maintained at 75° C. and unreacted monomers were polymerized. The polymerization product was then prepared as a final polyethylene via a solvent removal unit and dryer. The prepared polyethylene was mixed with 1000 ppm of calcium stearate (manufactured by DOOBON INC.) and 2000 ppm of heat stabilizer 21B (manufactured by SONGWON Industrial) and then made into pellets.

The polymerization activity, HLMI, density, amount of wax produced and FNCT of the polyolefin prepared above were measured according to the following criteria, and the results are shown in Table 2 below.

1) MI: The weight of the melted polymer resin which passed through a 2.1 mm orifice at 190° C. for 10 minutes under the condition of applying a force of 21.6 kg vertically to the gravity direction was measured according to ASTM D1238 standard.

2) Amount of wax produced: The content of wax volume sunk by settling 100 cc of hexane in the process for 24 hours was measured.

3) Stress cracking resistance (FNCT): Measured according to ASTM standard under the conditions of 80° C., 60 Mpa and IGEPAL CA-630 10% solution.

TABLE 2

| | Activity (kgPE/gSilica) | MI | Density | Amount of wax produced (cc) | FNCT (hr) |
|---|---|---|---|---|---|
| Example 1-2 | 18 | 16.0 | 0.942 | 5 | 326 |
| Example 2-2 | 16 | 16.2 | 0.940 | 10 | >1000 |
| Example 3-2 | 16 | 15.8 | 0.941 | 10 | 804 |
| Comparative Example 1-2 | 10 | 15.7 | 0.941 | 40 | 110 |
| Comparative Example 2-2 | 13 | 14.8 | 0.940 | 50 | 317 |

Referring to Tables 1 and 2, it was confirmed that in the case of Examples 1 to 3 using the catalysts prepared by hybrid-supporting three types of metallocene compounds, the amount of wax produced could be remarkably reduced and a very high stress cracking resistance (Full Notch Creep Test, FNCT) was exhibited, as compared with Comparative Examples 1 to 5 using the catalysts prepared by hybrid-supporting two types of metallocene compounds.

DESCRIPTION OF SYMBOLS

R1: First reactor
R2: Second reactor
Rp: Post reactor
C1: First hybrid supported metallocene catalyst
C2: Second hybrid supported metallocene catalyst
M1: First olefin monomer
M2: Second olefin monomer
MwE: Molecular weight regulator

What is claimed is:

1. A hybrid supported metallocene catalyst for the preparation of a polyolefin comprising ethylene, the hybrid supported metallocene catalyst comprising a combination of three metallocene compounds, the combination of three metallocene compounds being selected from:

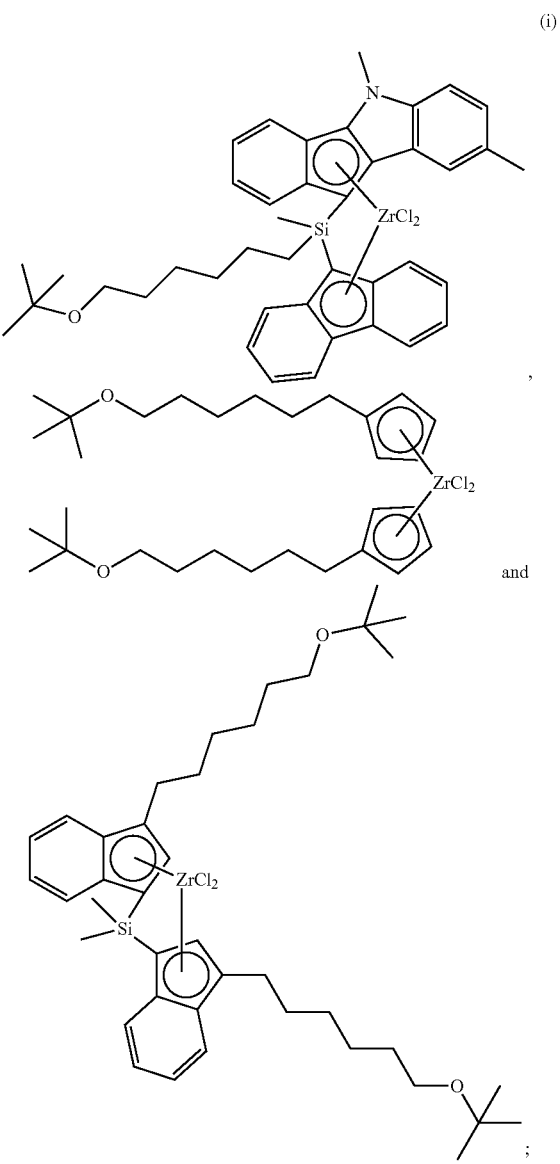

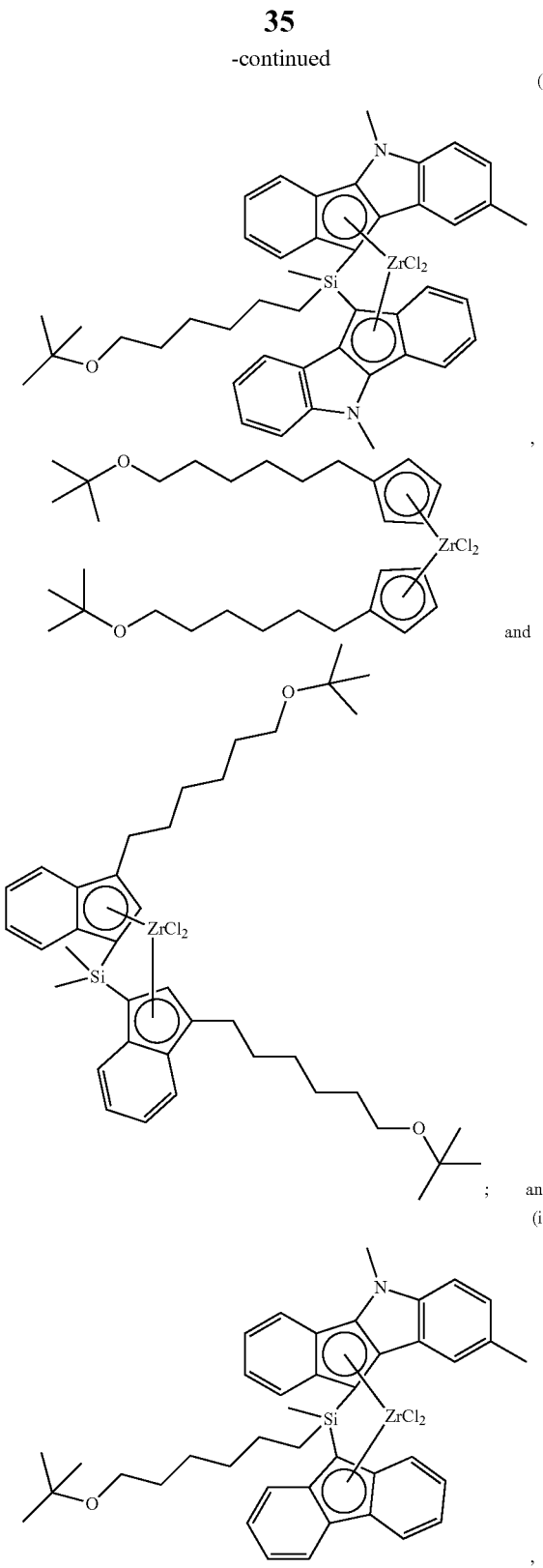

(ii)

, and (iii)

,

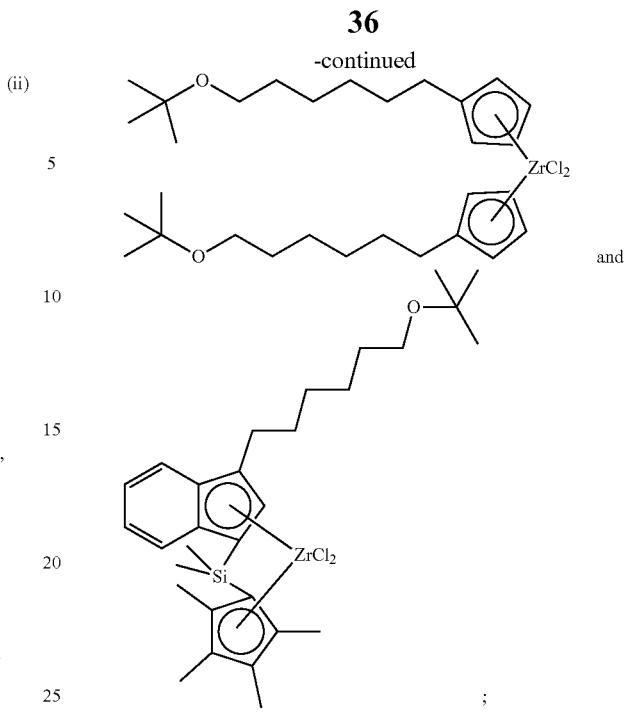

and

;

a cocatalyst compound; and a support.

2. The hybrid supported metallocene catalyst of claim 1, wherein the cocatalyst compound includes at least one selected from the group consisting of a first cocatalyst of the following Chemical Formula 5 and a second cocatalyst of the following Chemical Formula 6, —[Al($R_{27}$)—O—]$_k$—   [Chemical Formula 5]

in Chemical Formula 5, each $R_{28}$ is independently a halogen, a halogen-substituted or unsubstituted hydrocarbyl group having 1 to 20 carbon atoms, and k is an integer of 2 or more, $T^+[BG_4]^-$   [Chemical Formula 6]

in Chemical Formula 6, $T^+$ is a +1 valent polyatomic ion, B is boron in an oxidation state of +3, and G is each independently selected from the group consisting of a hydride group, a dialkylamido group, a halide group, an alkoxide group, an aryloxide group, a hydrocarbyl group, a halocarbyl group and a halo-substituted hydrocarbyl, wherein the G has or less carbon atoms, provided that G is halide at one or less position.

3. The hybrid supported metallocene catalyst of claim 1, wherein the weight ratio of the transition metals of the first metallocene compound, the second metallocene compound and the third metallocene compound to the support is 1:10 to 1:1000.

4. The hybrid supported metallocene catalyst of claim 1, wherein the weight ratio of the cocatalyst compound to the support is 1:1 to 1:100.

* * * * *